Jan. 10, 1939.    A. NAGEL    2,143,792
FOCUSING CAMERA
Filed May 1, 1937
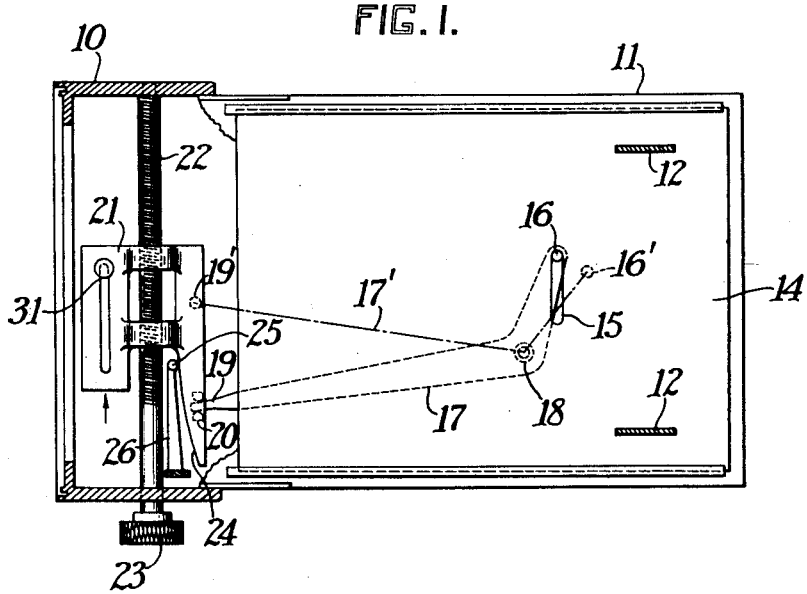
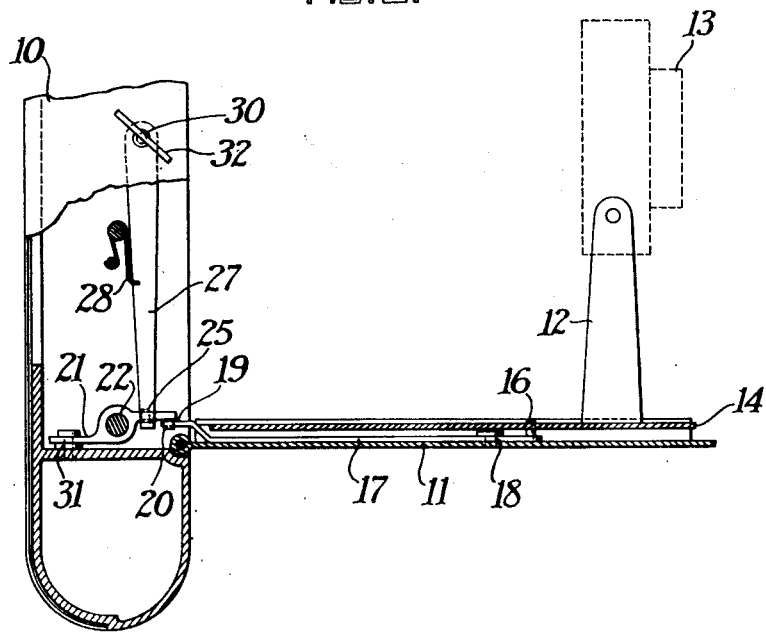
August Nagel
INVENTOR.
BY
ATTORNEYS Patented Jan. 10, 1939

2,143,792

UNITED STATES PATENT OFFICE 2,143,792

FOCUSING CAMERA

August Nagel, Stuttgart, Germany, assignor to Eastman Kodak Company, Rochester, N. Y., a corporation of New Jersey Application May 1, 1937, Serial No. 140,233
In Germany August 4, 1936

4 Claims. (Cl. 95—44)

This invention relates to photographic cameras having built in range finders. It relates particularly to means for operating the light ray deflecting device of the range finder.

Range finders which are suitable for use with photographic cameras usually have some light ray deflecting device which is adjustable either by rotation or by translation to a slight degree. For clarity, the description of the invention will be confined to its application to range finders of the type which have a reflecting surface rotatably mounted in the well-known manner. It is to be understood, however, that the invention is also applicable to range finders on which the adjusting element is a rotating wedge, a movable lens element or a similar device.

It is an object of the invention to provide a simple and accurate means for coupling the range finder adjusting element to the focusing adjustment which determines the position of the camera objective with respect to the focal plane. It is a particular object of the invention to provide a very convenient arrangement for automatically adjusting the camera focus as the range finder images are brought into coincidence in the well-known manner.

Still another object of the invention is to provide a structure in which there is a relatively long movement of an adjusting member to adjust the focusing plate a relatively short distance so that there is adequate movement for a range finder focusing cam.

Other advantages of the invention will become apparent from the following description when read in connection with the accompanying drawing in which:

Figure 1 is a plan partially in cross section of one embodiment of the invention.

Figure 2 is a side elevation of the camera shown in Figure 1.

The unnecessary impertinent details of the camera are omitted from the drawing. Similar reference numerals refer to similar details in each of the figures.

A camera comprising a housing 10 and a folding bed 11 carries its lens 13 on supports 12 in the well-known manner. These lens supports 12 are carried by a sliding member or bed plate 14 which is adjustable horizontally relative to the camera bed 11 for focusing purposes. A lever 17 which is rotatably mounted about a pivot 18 carries a pin 16 which projects through a slot 15 in the sliding member 14. Thus, rotation of the lever 17, such as to a position 17' causes the pin 16 to move to the position marked 16' and to slide along the slot 15 whereby the sliding member or bed plate 14 is moved forward thus focusing the camera objective 13 for near objects in the usual way.

When the camera is in its operative position as shown, the inner end 19 of the lever 17 is gripped between two studs 20 which project downward from a transversely movable member 21 whose position is adjustable by means of a screw 22 which projects through the camera housing to a knob 23. The movement of the sliding member 21 is confined by a pin and slot arrangement 31. When the knob 23 and the screw 22 are rotated clockwise (as viewed in Figure 2) the sliding member 21 moves in the direction (indicated by an arrow in Fig. 1) carrying the end 19 to the position marked 19'.

The sliding member 21 is provided with a cam surface 24, which, as will be pointed out, controls the setting of adjusting element of the range finder. A vertical lever 27 which is rotatably mounted on a pivot 30, is rigidly attached to a cross member 26 and thereby to a small vertical piece 25 on the end thereof. A spring 28 pressing against the side of the vertical lever 27 urges the end 25 against the cam surface 24 of the sliding member 21. Thus a transverse movement of the sliding member 21 in addition to focusing the camera, also causes the vertical lever 27 to rotate so that the end 25 is maintained in engagement with the cam surface 24 of said sliding member. The pivot 30 upon which the vertical lever 27 rotates projects through the camera housing into the range finder housing (not shown) and supports the movable member therein. As shown in the figure this movable member may comprise a reflector 32 operative in a well-known manner. As pointed out above, the range finder may be of any suitable type.

There are a number of advantages of the above described focusing structure, one being that since the slide 21 has to move a much greater distance than plate 14 in focusing, the cam 24 can be made long with a very gradual rise. Such a cam is less sensitive than a short cam to get the same range of movement of the range finder element. It is consequently easier to make a long cam accurate, and such a cam can be rigidly followed by a cam follower such as arm 25.

With a transversely moving slide such as the member 21, this necessary movement can be obtained even in the modern very thin cameras. Moreover room is afforded for accurately guiding the slide throughout its range of movement, which is of course, all totally inside of the camera body.

Having thus described one embodiment of the invention I wish to point out that it is not limited to the specific structure shown but is of the scope of the appended claims.

What I claim and wish to protect by Letters Patent of the United States is:

1. In a camera, the combination with a camera body of a bed hingedly attached thereto, a lens carrying plate slidably mounted on the bed, a sliding member carried by the camera body and movable therein parallel to the line of hinged attachment of the bed, lever means connecting the slidable plate to the transversely sliding member, a movable range finder element carried by the camera body, a cam carried by the transversely sliding member and connections between said cam and said range finder element for moving the latter by movement of the former whereby the range finder element and the lens carrying plate are adjusted simultaneously in focusing the camera.

2. In a camera, the combination with a camera body of a slide mounted to move therein transversely to the optic axis of the camera, means carried by the camera body including a screw and a handle extending outside of the camera body for moving the slide, a bed hinged to the body, a plate slidable on the bed longitudinally thereof, a lens supported by said plate, means for translating the transverse movement of the camera body slide to longitudinal sliding movement of the bed plate whereby the latter may be moved by the former for focusing the lens, a range finder element movably mounted on the camera body and connections between the transversely movable slide and the range finder element for moving the two in unison.

3. In a camera, the combination with a camera body of a slide mounted to move laterally therein, means carried by the camera body for moving the slide, a bed hinged to the body, a plate slidable longitudinally on the bed, a lens supported by said plate, means for translating the lateral sliding movement of the camera body slide into longitudinal sliding movement of the bed plate, said translating means comprising a bell crank lever pivotally secured to the bed, one arm of said lever slidably engaging the body slide and the other arm slidably engaging the bed plate whereby the latter may be moved by the former to focus the lens, a rangefinder element movably mounted on the camera body and connections between the laterally movable slide and the range finder element for moving the two in unison.

4. In a camera, the combination with a camera body of a slide mounted to move transversely therein, screw means including a handle outside of the camera body for moving the slide, a curved cam on the movable slide, a camera bed, a bed plate slidably mounted thereon and carrying a lens, connections between the bed plate and slide for moving the former by movement of the latter for focusing the lens, a range finder element movably mounted on the camera, an arm extending downwardly therefrom into engagement with said cam, said range finder element being adapted to be moved, through said arm, by the transversely movable cam, whereby said lens and rangefinder elements are simultaneously moved.

AUGUST NAGEL.